United States Patent Office 3,543,087
Patented Nov. 24, 1970

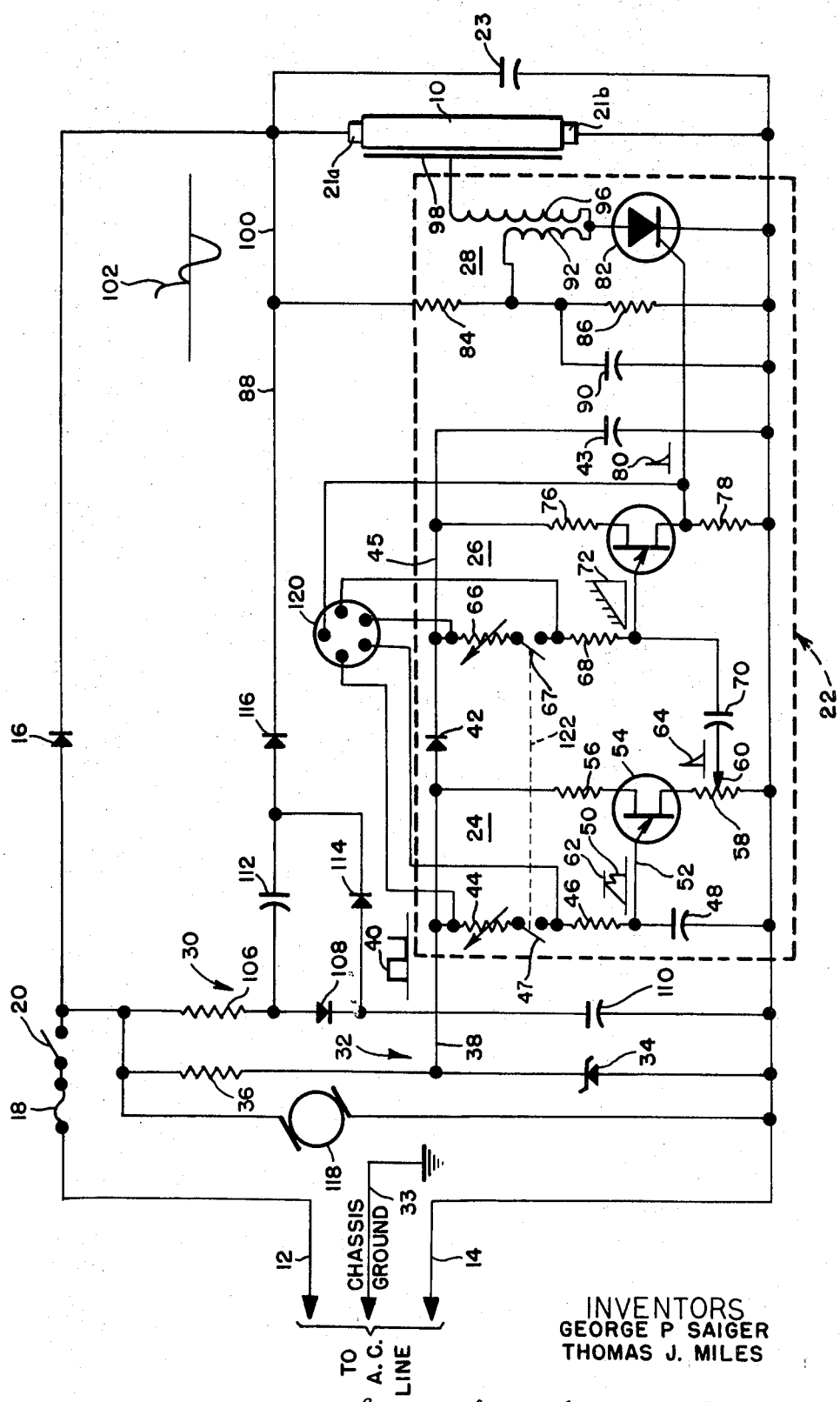

3,543,087
LAMP FLASHING CIRCUIT HAVING INDEPENDENTLY ADJUSTABLE RATE AND PHASE CONTROLS
George P. Saiger, Schiller Park, and Thomas J. Miles, Chicago, Ill., assignors to Diversitronics, Inc., Wauconda, Ill., a corporation of Illinois
Filed Mar. 27, 1968, Ser. No. 716,489
Int. Cl. H05b 41/34, 41/44
U.S. Cl. 315—208
14 Claims

ABSTRACT OF THE DISCLOSURE

A flashing device may comprise a gas-filled flash tube which produces light in response to an electrical discharge therethrough. The flash tube is connected through coupling means to a source of alternating voltage which supplies a high density current for the electrical discharge. A flash control means is operatively coupled to the flash tube for selectively causing the electrical discharges through the flash tube at a preselected rate and phase with respect to the alternating voltage.

---

The present invention relates to lamp flashing devices, and more particularly to such devices for use with gas-filled flash tubes which are operated or flashed in a periodic and controlled manner.

Controlled lamp flashing devices have found great utility in various fields of use and for a multitude of purposes, such as, for example, as a light source for photography, as a stroboscopic light source for permitting the viewing of rapidly moving machinery or objects, as warning lights on or for aircraft or other types of vehicles, and as stage lighting for producing certain types of theatrical effects.

Such gas-filled flash lamps are generally lighted by applying a high voltage, high density direct current source across the lamp electrodes, while ionizing the gas therein by the application of a high voltage or high frequency alternating current to an electrode adjacent the lamp so as to form a field which acts on the gas, the ionization of which permits the high density direct current to discharge therethrough. Flashing devices for providing controlled periodic flashing of gas-filled flash lamps are known to the art, but these have generally required special transformers and relatively large energy storage capacitors to achieve the desired lamp flashing operation, and thus have been costly and of relatively large size and weight.

Accordingly, it is an object of the present invention to provide an improved lamp flashing device which obviates the necessity for such special transformers and/or large storage capacitors, thereby decreasing the cost, size and weight of such device.

It is a further object of the present invention to provide an improved lamp flashing device which provides selective control of the flashing rate as well as of the exact moment in time whereat the flashes occur.

It is another object of the present invention to provide an improved lamp flashing device which may be operated directly from standard utility lines, and which provides pulses for triggering the flash lamp at selectively controlled rates and in selected phase synchronism with the line voltage, whereby the device may be operated efficiently and reliably over long periods of time, providing great versatility as to its use.

These and other objects of the invention are more particularly set forth in the following detailed description and in the accompanying drawing which is an electrical schematic diagram showing a preferred circuit used in a lamp flashing device in accordance with an embodiment of the present invention.

In general, a lamp flashing device is shown comprising gas-filled lighting means 10, illustrated as a xenon flash tube, which produces light in response to an electrical discharge therethrough, and coupling means for connecting the lighting means 10 to a source of alternating voltage, such coupling means including leads 12 and 14 which may be connected to the A.C. line to connect the lighting means 10 thereto through a series combination of a rectifier 16, a fuse 18 and a main power switch 20, so that rectified A.C. is selectively applied across the lighting means 10 at its terminals 21a and 21b.

Flash control means 22, shown as the circuitry enclosed in dotted line, is operatively coupled to the lighting means 10 for controllably causing electrical discharges through the lighting means at a preselected rate and preselected phase with respect to the alternating voltage source applied to leads 12 and 14. The flash control means 22 includes phase control means 24 for determining the preselected phase relation of the electrical discharges through the lighting means 10 to the applied alternating voltage wave, and further includes rate control means 26 for determining the preselected rate or frequency of the discharges through the lamp 10, and consequently the rate of flashing, independently of the setting of the phase control means 24. In addition, the flash control means 22 includes triggering means 28 which is responsive to the rate control means 26 and applies a firing or trigger signal to the lighting means 10 to effect the electrical discharge therein, and to produce the desired flashing operation of the lamp.

The lamp flashing device further comprises means 30, illustrated as a voltage tripler circuit, for non-inductively providing an increased voltage derived from the alternating voltage source to the triggering means 28, as well as a voltage regulating circuit 32 for providing regulated D.C. to the control elements of the phase control and rate control means, 24 and 26, respectively.

More particularly, as illustrated in the drawing, a rectifier diode 16 of any suitable conventional type supplies a half-wave D.C. voltage for the flash tube 10. The diode 16 has its anode connected to the A.C. line through power switch 20, fuse 18, and lead 12, and its cathode connected directly to terminal 21a of the flash tube 10. The opposite terminal 21b of the flash tube 10 is connected directly to the other side of the A.C. line through lead 14, which is utilized as a common or reference bus with respect to the D.C. potentials present within the circuit. A chassis ground lead 33 is also provided for reasons of safety. A filter capacitor 23 is connected directly across the D.C. voltage source provided by diode 16, in parallel with the flash tube 10, so as to provide a constant D.C. voltage across the flash tube. This D.C. voltage is desirably maintained constant during the nonconductive condition of the flash tube so that it is always ready to be flashed when appropriately triggered.

The D.C. supplied by diode 16 during the conductive or "flash" condition of the flash tube 10 is of relatively high order, but is adequately handled by the current capacity of the utility line. The diode 16, of course, must have a sufficiently high rating to reliably handle this high current surge requirement. Other rectifier arrangements may, of course, be employed, such as, for example, a full-wave bridge.

The voltage regulating circuit 32 is formed by the series combination of a Zener diode 34 and a limiting resistor 36, the combination being connected across the A.C. line by means of leads 12 and 14 through fuse 18 and power switch 20. A regulated half-wave rectified voltage is thus produced across the Zener diode 34 on the lead 38 having the square or clipped waveform 40. The regulated voltage pulses 40 are applied to the phase control means 24 and to the rate control means 26, but the pulses being fed to the latter are supplied through a blocking diode 42 having a filter capacitor 43 connected thereacross so that a constant D.C. voltage is provided on lead 45 across the rate control means 26.

Turning now to the phase control means 24, a resistance-capacitance timing circuit is formed by a variable resistor or potentiometer 44 serially connected through switch contacts 47 to a fixed resistor 46 and a timing capacitor 48, the series combination of these components being connected across the regulated pulse voltage lead 38 supplied by Zener diode 34. On each voltage pulse of the waveform 40 provided across the timing circuit, a ramp voltage pulse 50 is generated across the timing capacitor 48 on lead 52 and is applied to the emitter electrode of a phase control unijunction transistor 54. The phase control unijunction transistor 54 has its upper base coupled to the regulated pulse voltage lead 38 through a biasing resistor 56, and its lower base connected to the common lead 14 through a variable output resistor or potentiometer 58. The output signal from the output resistor 58 is taken from the variable tap or wiper terminal 60. Consequently, when the increasing ramp voltage pulse 50 reaches the conducting or switching threshold potential of the unijunction transistor 54, such as at the potential indicated as 62, the phase control unijunction transistor 54 becomes abruptly conductive and produces an output pulse or spike 64 at the wiper 60. The voltage developed across the timing capacitor 48 again commences to form a further ramp voltage, but the trailing edge of the regulated D.C. voltage pulses 40 upon going to zero potential, causes the unijunction transistor 54 to discharge the residual potential so developed.

Since the time-constant of the phase control timing circuit may be varied by the potentiometer 44, the preselected value of resistance provided thereby determines the amount of time that will elapse before the ramp voltage pulse 50 across the timing capacitor 48 reaches the switching threshold level of the phase control unijunction transistor 54, and consequently determines the time interval between the leading or rising edge of the voltage pulses 40 and the occurrence of the output spike 64.

The potentiometer 44 control knob is thus disposed externally of the device housing and provides a means for adjusting the phase relationship of the output pulses 64 with respect to the regulated square wave pulses 40, the latter of which are necessarily in phase with the A.C. line voltage, or in a fixed phase relationship thereto. Employing a regulated half-wave pulse train, as shown, the output pulses 64 may have a rate of 60 pulses per second. However, a different pulse rate may be provided by supplying a different pulse train to the phase control means 24, as by employing a full-wave pulse train to provide output pulses 64 at a rate of 120 pulses per second, such modification being made in a manner well known to the art. Pulse-train producing means other than the voltage regulating circuit 32 may of course be alternatively provided, but generally less advantageously.

As previously mentioned, the regulated voltage pulses 40 are also applied to the rate control means 26, but the blocking diode 42 and filter capacitor 43 provide a constant D.C. voltage which is applied to a rate control timing circuit formed by the rate potentiometer or variable resistance 66 which is serially connected through switch contacts 67 to a fixed resistor 68 and a rate timing capacitor 70 which is, in turn, coupled to the output wiper 60 of the phase control output resistor 58. The portion of the resistor 58 between the wiper 60 and the common lead 14 is common to both the phase control circuit and the rate control circuit. The time-constant of the rate timing circuit is generally longer than the time-constant of the phase timing circuit and is adjustable to a selected value by means of the potentiometer 66. Since the rate timing capacitor 70 is coupled to the phase control output 60 in the manner described, a voltage waveform 72 is produced on the lead 74 which is essentially an increasing ramp voltage having the phase control output pulses 64 superimposed thereon, as shown. The voltage 72 is applied to the emitter electrode of the rate control unijunction transistor 75, the upper base of which is coupled to the D.C. voltage on lead 45 through biasing resistor 76 and the lower base of which is connected to the reference lead 14 through rate control output resistor 78. Consequently, when the composite or modified ramp voltage pulse 72 reaches the conducting or switching threshold level of the rate control unijunction transistor 75, the latter becomes abruptly conductive to produce an output pulse 80 across the rate control output resistor 78.

More specifically, the potentiometer 66, which also has a knob adjustment externally of the device housing, determines the rapidity of voltage build-up on the lead 74, or in other words, the period of time from the preceding capacitor discharge to the point of firing of the rate control unijunction transistor 75. However, the rate of increase of the ramp voltage may be relatively slow and the exact moment in time for unijunction firing will be generally determined by the overriding phase control pulses or spikes 64, so that when the ramp voltage on lead 74 is in the vicinity of or approximately near the threshold voltage of the rate control unijunction transistor 75, the subsequent phase control pulse superimposed thereon will cause the unijunction transistor to become conductive, producing the output spike 80. Therefore, when the rate control potentiometer 66 is adjusted to provide a relatively high resistance, the output pulses 80 will occur at a relatively slow rate; however, when the potentiometer 66 is adjusted to have a relatively low resistance, the output pulses 80 will occur at a relatively fast or rapid rate. But in any case, the exact moment in time or phase relationship to the regulated voltage pulses 40 (and consequently with the alternating line voltage) will be determined by the position in time of the phase pulses 64, as determined by the setting of the phase potentiometer 44. For example, the rate-control potentiometer 66 may be adjusted or set to provide a time-constant producing an output rate-control pulse-rate of 10 pulses per second. In this case, the composite ramp voltage 72 extends over a time period of six phase-control pulses (assuming the phase-control pulse rate is 60 p.p.s.) and one rate-control pulse 80 is produced for every six phase-control pulses, each of which is superimposed on the ramp of voltage pulse 72. The position of every sixth pulse 64 determines the exact moment in time (and phase) of the occurrence of each rate-control pulse 80.

The phase control output resistor 58 has the wiper 60 adjusted to provide a resistance of such value as to produce output pulses 64 of sufficient amplitude to achieve the desired triggering of the rate control transistor 75 in this manner. Thus the adjustment of wiper 60 need be made only initially, and desirably may be located internally of the device housing.

The rate control pulses 80 are supplied to the triggering means 28 which includes a normally nonconductive silicon controlled rectifier (SCR) 82, the rate control pulses 80 being applied to the gate electrode thereof. The triggering means 28 further includes a voltage divider formed by serially connected resistors 84 and 86 which are connected from the voltage tripler circuit 30 via an auxiliary voltage supply lead 88 to the reference lead 14. The voltage tap or junction of the voltage divider between resistors 84 and 86 supplies a charge to a trigger capacitor 90 connected in parallel with voltage divider resistor 86. The voltage divider tap is also connected to one end of the primary winding 92 of a trigger transformer 94, which has its other end connected to the anode of the silicon controlled rectifier 82 and to one end of the secondary winding 96. The other end of the secondary winding 96 is connected to a trigger or "tickler" electrode 98 positioned in proximity to the flash tube 10 for creating the required field to ionize the flash tube in a known manner. The auxiliary voltage supply lead 88 supplies the output of the voltage tripler circuit 30 to charge the trigger capacitor 90 at a relatively rapid rate due to the relatively short time-constant of this circuit, so that when the rate-control pulses 80 trigger the SCR 82, causing the SCR to become conductive, the trigger capacitor 90 abruptly discharges through the primary winding 92 and through the SCR 82 and causes a high voltage to be produced on the trigger electrode 98. This ionizes the gas within the flash tube 10, permitting the D.C. voltage thereacross (derived from the line voltage on leads 12 and 14) to discharge through the flash tube to produce the desired flash. The SCR 82 becomes nonconductive after each firing when its anode voltage drops temporarily to zero, but is again triggered thereafter by the occurrence of a subsequent rate-control pulse 80 applied to its gate electrode.

The increased voltage from the voltage tripler output 88 is also applied across the flash tube 10 by means of lead 100 to provide a "boost" to the initial electrical discharge and generally provides increased reliability of flashing; however, in some instances where the A.C. line voltage is sufficiently high, this coupling may be eliminated and satisfactory results will still be produced.

The voltage waveform which may be present across the flash tube 10 during each flash is shown as 102, which indicates the abrupt drop in voltage on flashing when there occurs an abrupt current surge from the line. The negative portion of the voltage waveform 102 is believed to be produced by the recovery time of the diode 16 after each current surge, which may allow the next succeeding negative half-cycle of A.C. voltage to pass therethrough. The relatively small filter capacitor 23 otherwise tends to maintain the D.C. voltage across the flash tube 10 relatively constant.

The high density direct current necessary to support the electrical discharge in the flash tube 10 to provide the desired illumination or flash intensity is easily provided by the current capacity of the line, while the higher voltage which is required for triggering is provided by the voltage tripler 30 coupled to the triggering circuit 28.

The voltage tripler circuit 30 provides a non-inductive voltage multiplying means of relatively low cost, size, and weight and is formed by the combination of capacitors and rectifying diodes coacting to effectively triple and rectify the applied A.C. voltage. More specifically, the A.C. line voltage from leads 12 and 14 is applied across the series combination of resistor 106, diode 108 and capacitor 110. A capacitor 112 and a diode 114 are each respectively connected from opposite sides of the diode 108, as shown, to a series connected diode 116 which has a forward or positive polarity. The cathode of diode 116 is connected to the auxiliary voltage supply lead 88 and provides a positive D.C. potential thereon.

The voltage tripler operates to produce a multiplying effect by charging first one capacitor and then the other on the first two cycles of applied voltage, and on the third and successive cycles, the applied voltage is added to the stored voltages in a manner known, per se.

A blower 118 of any suitable type is connected across the line voltage and provides cooling for stable and efficient component operation.

A receptacle 120 is provided as shown to allow remote control of the flashing device and for synchronizing several of such units together. The receptacle 120 is wired across each of the potentiometers 44 and 66 together with their respectively associated switch contacts 47 and 67, which are ganged together to form a single switch 122 to allow stopping and starting of the device without the necessity of using the main power switch 20. These connections permit remote control of the device, while the receptacle connection to the output of the rate-control transistor 75 permits plural device synchronization.

Thus, as can be seen, a flashing device is disclosed which may be employed to flash a gas-filled flash tube, such as of the xenon type, at a preselected rate and at an independently preselected phase with respect to the line voltage frequency. The particular phase that is selected determines the amount of energy that is supplied to the flash tube, since the duration of electrical discharge and its consequent flash extends from the point of triggering to the end of a half cycle of A.C. voltage, at which time the flash tube extinguishes. Thus, the earlier the flash tube is triggered in each cycle of line voltage, the longer will be the flash duration, the greater is the energy supplied to the flash tube, and the greater the amount of light emitted.

This phase control capability has another significant aspect in that when the lamp flashing device is used as a stroboscope for viewing a moving object or piece of machinery, the phase control permits the viewed image to appear stationary in substantially any position. This may be accomplished by first adjusting the rate control potentiometer 66 so that the rate of flashing is equal to the equivalent frequency of movement, and then the phase control potentiometer 44 may be adjusted so that the flashing occurs during any desired instant within the period of the movement.

A specific construction of the device in accordance with the present embodiment of the invention has been found satisfactory for use from a 120 v., 60 c.p.s. line, wherein the voltage tripler 30 provides an output of 450 volts. Other voltage multiplications (e.g., a doubler) may of course be employed depending on the nature of the A.C. line voltage and the particular flash tube employed.

Although a specific embodiment of the present invention has been illustrated and described, various modifications of the features and aspects of the present invention will be apparent to those skilled in the art; and accordingly, the scope of the invention should be defined only by the claims and equivalents thereof.

Various features of the invention are set forth in the following claims.

What is claimed is:

1. A flashing device for use with a gaseous lighting means for producing light in response to an electrical discharge, comprising means for coupling said lighting means to an A.C. line voltage source, means connected across the A.C. source for applying an increased voltage relative to said source across said lighting means, a trigger electrode disposed in proximity to said lighting means for producing upon energization of said electrode an ionizing field in said lighting means, flash control means for generating pulses at a preselected rate and phase relative to said A.C. line voltage source, and means for coupling said pulses to said trigger electrode for initiating electrical discharges through said lighting means at said preselected rate and phase.

2. The flashing device of claim 1 wherein said flash control means includes phase control means for determining the preselected phase relation of the electrical discharges to said alternating voltage.

3. The flashing device of claim 2 wherein said flash control means further includes rate control means for determining said preselected rate independently of said phase control means.

4. The flashing device of claim 3 wherein said flash control means further includes triggering means responsive to said rate control means for applying said pulses to said trigger electrode.

5. The flashing device of claim 2 wherein said phase control means includes timing means having an adjustably variable time-constant and a threshold switching device coupled thereto for producing an output pulse during each period of said alternating voltage having a phase relation thereto determined by adjustment of said timing means.

6. The flashing device of claim 5 comprising a rate control means including further timing means having an adjustably variable time-constant and a further threshold switching device coupled thereto, said further timing means having a generally greater maximum time-constant than said first mentioned timing means and being coupled to the output of said phase control means to produce a composite switching signal to said further threshold switching device, whereby output pulses are produced therefrom at a rate determined by adjustment of said further timing means and with a phase determined by adjustment of said first-mentioned timing means.

7. The flashing device of claim 1 wherein said means for applying an increased voltage across said lighting means comprises means for non-inductively deriving said increased voltage from said A.C. voltage source.

8. The flashing device of claim 7 wherein said non-inductive means comprises a voltage multiplier circuit.

9. The flashing device of claim 1 wherein said means for applying an increased voltage across said lighting means includes a rectifier for providing said increased voltage in the form of D.C.

10. The flashing device of claim 1 wherein said means for coupling said lighting means to said A.C. source comprises a rectifier directly coupled therebetween for applying a D.C. voltage across said lighting means.

11. The flashing device of claim 1 further comprising a capacitor connected in shunt with said lighting means.

12. A flashing device comprising a gas discharge lamp, means coupled to an A.C. line voltage source for applying a rectified voltage across said lamp, a trigger electrode disposed in proximity to said lamp for producing upon energization of said electrode an ionizing field in said lamp, flash control means comprising phase control means for generating first signal pulses having a preselectable phase relation to the A.C. voltage source, rate control means responsive to said first signal pulses for generating second signal pulses having a preselectable pulse-rate relative to said A.C. voltage source and occurring in said preselectable phase relation thereto, and triggering means responsive to said second signal pulses for energizing said trigger electrode with a firing pulse on the occurrence of each of said second signal pulses.

13. The flashing device of claim 12 wherein said rate control means comprises means for generating a ramp voltage signal, means for adding a plurality of said first signal pulses to said ramp voltage signal to form a composite signal, and means responsive to said composite signal for generating one of said second signal pulses at a time corresponding to the occurrence of one of said added first signal pulses.

14. The flashing device of claim 13 wherein said rate control means further comprises means for controllably varying the rate of rise of said ramp voltage signal.

References Cited

UNITED STATES PATENTS

| | | | |
|---|---|---|---|
| 2,473,237 | 6/1949 | Bivens | 315—208 X |
| 2,749,481 | 6/1956 | Klein | 315—205 |
| 3,150,307 | 9/1964 | Kaeding | 318—345 |
| 3,353,062 | 11/1967 | Nuckolls | 315—157 |
| 3,445,167 | 5/1969 | Armstrong et al. | 356—23 |

JAMES W. LAWRENCE, Primary Examiner

E. R. LaROCHE, Assistant Examiner

U.S. Cl. X.R.

315—227, 246; 356—23; 307—246